(12) United States Patent
Naito et al.

(10) Patent No.: US 11,309,570 B2
(45) Date of Patent: Apr. 19, 2022

(54) FUEL CELL SYSTEM

(71) Applicant: HONDA MOTOR CO., LTD., Tokyo (JP)

(72) Inventors: Hideharu Naito, Wako (JP); Masahiro Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 321 days.

(21) Appl. No.: 16/705,299

(22) Filed: Dec. 6, 2019

(65) Prior Publication Data

US 2020/0185752 A1 Jun. 11, 2020

(30) Foreign Application Priority Data

Dec. 11, 2018 (JP) .............................. JP2018-231553

(51) Int. Cl.
*H01M 8/2475* (2016.01)
*H01M 8/2484* (2016.01)

(52) U.S. Cl.
CPC ....... *H01M 8/2475* (2013.01); *H01M 8/2484* (2016.02)

(58) Field of Classification Search
CPC ............ H01M 8/2475; H01M 8/2484; H01M 8/2485; H01M 2250/20; H01M 8/1006; H01M 8/026; H01M 8/2483; Y02E 60/50; Y02T 90/40
See application file for complete search history.

(56) References Cited

U.S. PATENT DOCUMENTS

| 2014/0234743 A1* | 8/2014 | Sasamoto | H01M 8/2483 |
| | | | 429/456 |
| 2015/0270562 A1* | 9/2015 | Naito | H01M 8/2483 |
| | | | 429/458 |
| 2016/0064765 A1 | 3/2016 | Nishiyama et al. | |
| 2017/0149075 A1* | 5/2017 | Naito | H01M 8/04156 |
| 2018/0062194 A1* | 3/2018 | Naito | H01M 8/2404 |

FOREIGN PATENT DOCUMENTS

JP 6104864 3/2017

* cited by examiner

*Primary Examiner* — Muhammad S Siddiquee
(74) *Attorney, Agent, or Firm* — Amin, Turocy & Watson, LLP

(57) ABSTRACT

In a fuel cell system, a stack case storing a stack body including a plurality of stacked power generation cells is formed to include a peripheral wall case and an end plate. An inner main surface is provided at one end of the end plate in a thickness direction, facing the inside of the stack case. A connection channel connecting a first opening opened in an upper part of an outer peripheral end surface of the end plate and a second opening opened in the inner main surface of the end plate are provided inside the end plate. The inside of the stack case and an exhaust gas duct are connected together through a plate connection member connected to the first opening.

10 Claims, 7 Drawing Sheets

FUEL CELL SYSTEM

CROSS-REFERENCE TO RELATED APPLICATION

This application is based upon and claims the benefit of priority from Japanese Patent Application No. 2018-231553 filed on Dec. 11, 2018, the contents of which are incorporated herein by reference.

BACKGROUND OF THE INVENTION

Field of the Invention

The present invention relates to a fuel cell system including a stack body formed by stacking a plurality power generation cells, and an end plate provided at one end of the stack body in a stacking direction.

Description of the Related Art

For example, a solid polymer electrolyte fuel cell includes a membrane electrode assembly (MEA) formed by providing an anode on one surface of an electrolyte membrane, and a cathode on the other surface of the electrolyte membrane. The electrolyte membrane is a polymer ion exchange membrane. A power generation cell is formed by sandwiching the membrane electrode assembly between separators. A plurality of the power generation cells are stacked together to form a stack body. Further, end plates, etc. are stacked on the stack body to hold the power generation cells that are stacked together, and thus, to produce a fuel cell system.

In use, for example, the fuel cell system of this type is mounted in a mounting space of a fuel cell vehicle. In this case, even if a fuel gas, in particular, hydrogen is leaked out of the stack body, etc., it is required to suppress stagnation of the leaked fuel gas in the mounting space, etc. inside the vehicle. In this regard, for example, Japanese Patent No. 6104864 proposes a fuel cell system having structure where a stack body is stored in a stack case. In this fuel cell system, end plates serve as side walls of the stack case at both ends in the stacking direction. A connection member is connected to a through hole penetrating through this end plate in a thickness direction (stacking direction), from the outside in the stacking direction, and the inside of the stack case is connectable to (in fluid communication with) the exhaust gas duct through the connection member. In the structure, it becomes possible to guide the leaked fuel gas in the stack case to a predetermined position, e.g., to the outside of the vehicle through the exhaust gas duct, and suppress stagnation of the leaked fuel gas in the storage space, etc.

SUMMARY OF THE INVENTION

A main object of the present invention is to provide a fuel cell system in which, even in the case of adopting structure where a plate connection member for connecting the inside of a stack case to an exhaust gas duct which guides a leaked fuel gas to a predetermined position, is connectable to an end plate, it possible suppress increase in the size in the stacking direction.

According to an embodiment of the present invention, a fuel cell system is provided. The fuel cell system includes a stack body including a plurality of stacked power generation cells, a stack case configured to store the stack body, and an end plate provided at an end of the stack body in a stacking direction, wherein the stack case is formed to include a peripheral wall case configured to cover an outer peripheral surface of the stack body, and the end plate, the end plate has an inner main surface provided at one end of the end plate in a thickness direction, the inner main surface facing inside of the stack case, the end plate has a first opening opened in an upper part of an outer peripheral end surface of the end plate and a second opening opened in the inner main surface, in an upper part of the end plate, a connection channel configured to connect the first opening and the second opening is provided inside the end plate, and the inside of the stack case and an exhaust gas duct are connected together through a plate connection member connected to the first opening.

In the fuel cell system of the present invention, the plate connection member for connecting the inside of the stack case and the exhaust gas duct together, is connectable to the first opening opened in the outer peripheral end surface of the end plate. In the structure, unlike the case where the first opening is provided in the back surface of the inner main surface of the end plate, even if the plate connection member is connected to the end plate, the plate connection member does not protrude significantly outside the stack case in the stacking direction. Consequently, even in the case of adopting structure where the plate connection member for connecting the inside of the stack case to the exhaust gas duct which guides the leaked fuel gas to the predetermined position, is connectable to the end plate, it is possible to suppress increase in the size of the fuel cell system, in particular, in the stacking direction.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
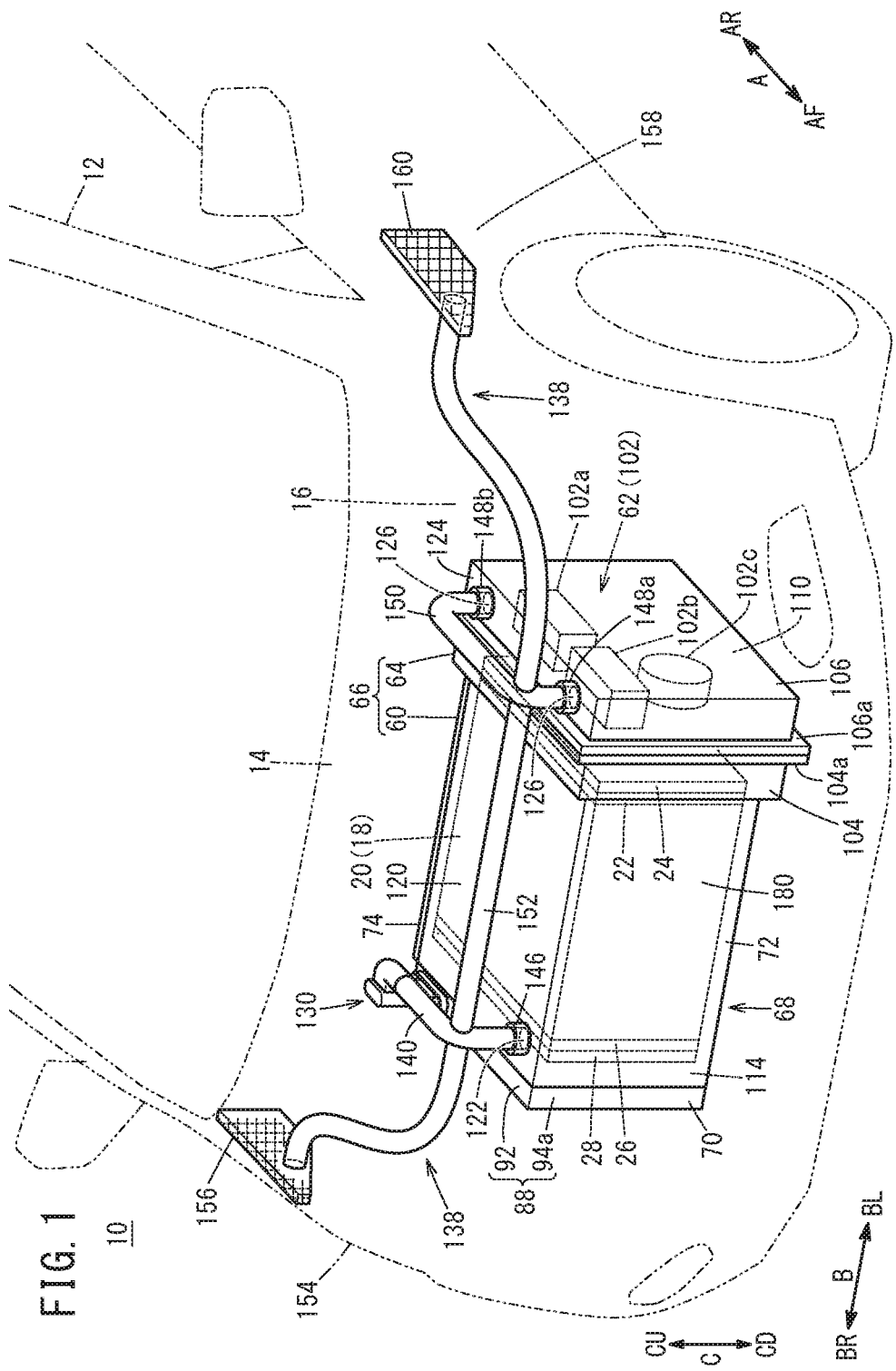
FIG. 1 is a perspective view schematically showing a fuel cell vehicle equipped with a fuel cell system according to an embodiment of the present invention.

Preferred embodiments of a fuel cell system according to the present invention will be described with reference to the accompanying drawings. In the drawings, the constituent elements which have the same or similar functions and which offer the same or similar advantages are labeled with the same reference numerals, and description of such constituent elements may not be repeated.

In the embodiment of the present invention, as an example shown in FIG. 1, it is assumed that a fuel cell system 10 is mounted in a fuel cell vehicle 12 which is a fuel cell electric automobile. However, the present invention is not limited specially in this respect. The fuel cell system 10 may be mounted in various mounting targets (not shown). Hereinafter, unless specially noted, based on a direction viewed from a passenger (not shown) seated on the driver's seat of the fuel cell vehicle 12, a front/rear direction (indicated by an arrow A), a left/right direction (indicated by an arrow B), and an upper/lower direction (indicated by an arrow C) will be described.

The fuel cell system 10 is provided in a front room (motor room) 16 formed on the front side (indicated by an arrow AF) of a dashboard 14 of the fuel cell vehicle 12. Further, the fuel cell system 10 includes a stack body 20 formed by stacking a plurality of power generation cells 18 (see FIG. 2) in the left/right direction (indicated by an arrow B). At one end of the stack body 20 in a stacking direction (left end, end in a direction indicated by an arrow BL), a first terminal plate 22 is provided. A first insulating plate 24 is provided outside the first terminal plate 22. At the other end of the stack body 20 in the stacking direction (right end, end in a direction indicated by an arrow BR), a second terminal plate 26 is provided. A second insulating plate 28 (insulating plate) is provided outside the second terminal plate 26.

Figure 2:
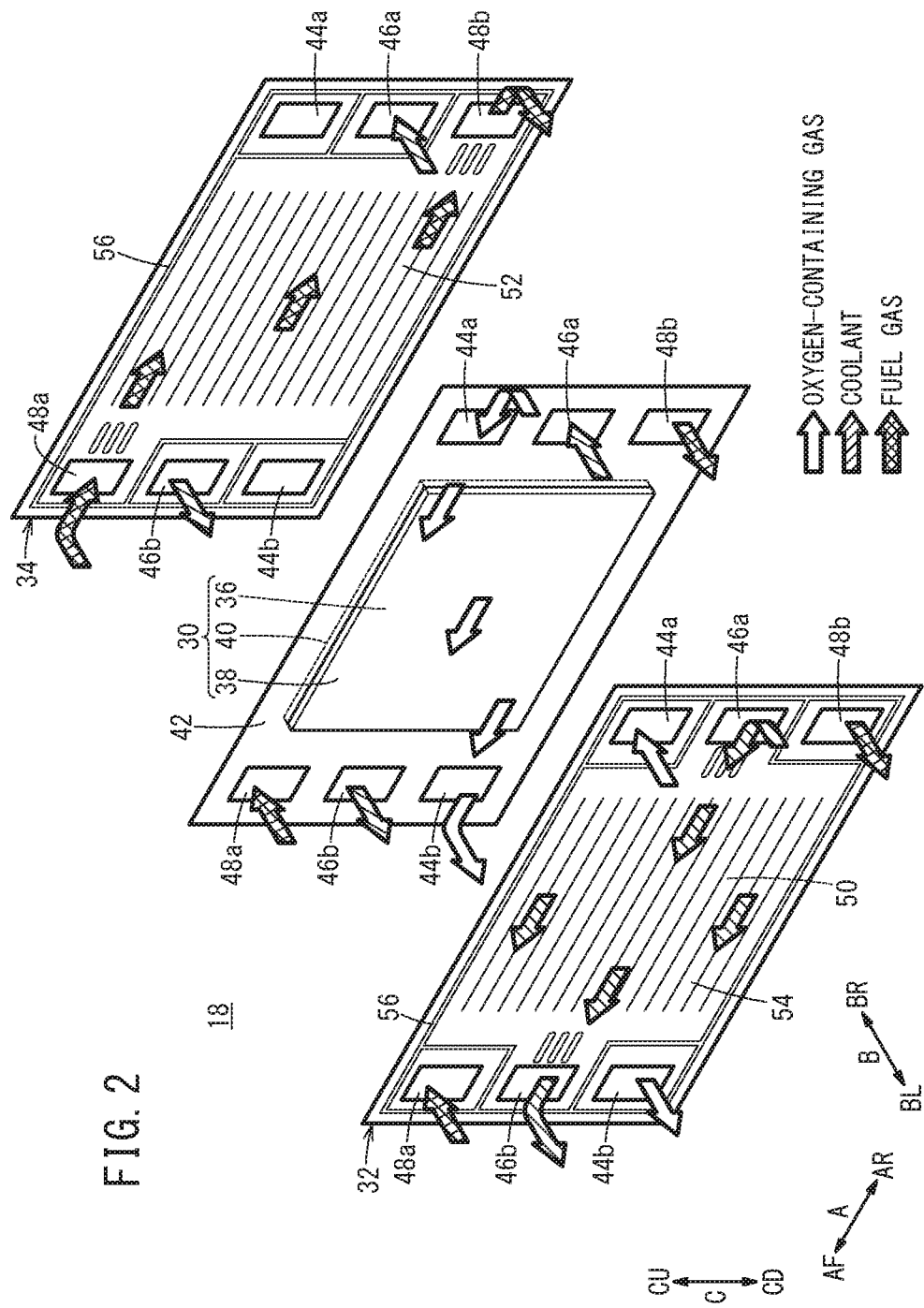
FIG. 2 is an exploded perspective view showing a power generation cell.

As shown in FIG. 2, a power generation cell 18 includes a membrane electrode assembly 30, and a first separator 32 and a second separator 34 sandwiching the membrane electrode assembly 30. The membrane electrode assembly 30 includes an electrolyte membrane 36, and a cathode 38 and an anode 40 provided on both sides of the electrolyte membrane 36. A film shaped resin frame member 42 is provided over the entire periphery of an outer peripheral portion of the membrane electrode assembly 30. The first separator 32 and the second separator 34 are metal separators or carbon separators.

At one end (end in a direction indicated by an arrow AR) of the rectangular power generation cell 18 in a longitudinal direction (indicates by the arrow A), an oxygen-containing gas supply passage 44a, a coolant supply passage 46a, and a fuel gas discharge passage 48b are arranged in a vertical direction (indicated by the arrow C). The oxygen-containing gas supply passage 44a, the coolant supply passage 46a, and the fuel gas discharge passage 48b extend through the power generation cell 18 in a stacking direction (indicated by an arrow B). An oxygen-containing gas is supplied to the oxygen-containing gas supply passage 44a. A coolant is supplied to the coolant supply passage 46a. A fuel gas such as a hydrogen-containing gas is discharged from the fuel gas discharge passage 48b.

At the other end (end indicated by an arrow AF) of the power generation cell 18 in the longitudinal direction, a fuel gas supply passage 48a for supplying the fuel gas, a coolant discharge passage 46b for discharging the coolant, and an oxygen-containing gas discharge passage 44b for discharging the oxygen-containing gas are arranged in the vertical direction.

The first separator 32 has an oxygen-containing gas flow field 50 on its surface facing the membrane electrode assembly 30. The oxygen-containing gas flow field 50 is connected to the oxygen-containing gas supply passage 44a and the oxygen-containing gas discharge passage 44b. The second separator 34 has a fuel gas flow field 52 on its surface facing the membrane electrode assembly 30. The fuel gas flow field 52 is connected to the fuel gas supply passage 48a and the fuel gas discharge passage 48b.

A coolant flow field 54 is formed between the first separator 32 of one of the power generation cells 18 that are adjacent to each other and the second separator 34 of the other of the adjacent power generation cells 18. The coolant flow field 54 is connected to the coolant supply passage 46a and the coolant discharge passage 46b. Seal members 56 are provided separately from, or integrally with the first separator 32 and the second separator 34, respectively. The seal members 56 contact the resin frame member 42, respectively. The first separator 32 and the second separator 34 may be provided with, instead of the seal members 56, bead seals (not shown) protruding toward the resin frame member 42 by press forming.

As shown in FIG. 1, the fuel cell system 10 includes a case unit 66 made up of a stack case 60 storing the stack body 20, and an auxiliary device case 64 storing the fuel cell auxiliary device 62. The case unit 66 has a rectangular shape in a plan view, and the long sides of the case unit 66 extend in the vehicle width direction (stacking direction of the stack body 20 indicated by the arrow B).

Figure 3:
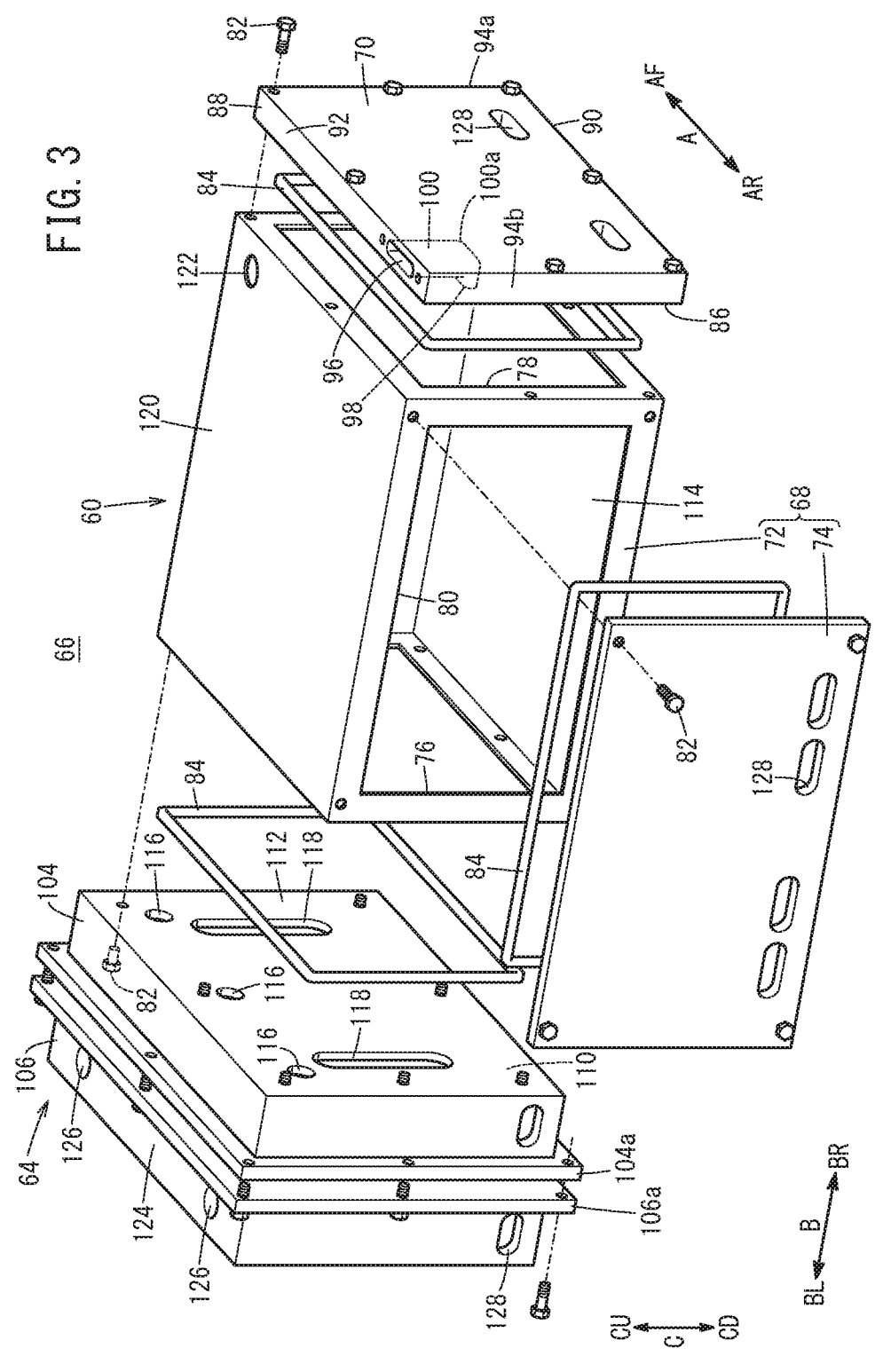
FIG. 3 is an exploded perspective view showing a stack case.

As shown in FIG. 3, the stack case 60 is formed to include a peripheral wall case 68 covering the outer peripheral surface of the stack body 20 (see FIG. 1), and an end plate 70 provided at a right end of the stack body 20 in the stacking direction (end indicated by an arrow BR). The peripheral wall case 68 includes a case body 72 having a rectangular shape in a plan view, and a rear panel 74. The case body 72 includes a rectangular left opening 76 formed on the left side (in a direction indicated by an arrow BL), a rectangular right opening 78 formed on the right side (in a direction indicated by an arrow BR), and a rectangular rear opening 80 formed on the rear side (in a direction indicated by an arrow AR). The case body 72 has a box shape.

The rear panel 74 is fixed to the case body 72 using bolts 82 in a manner to close the rear opening 80. A seal member 84 made of elastic material is interposed between the case body 72 and the rear panel 74, along the outer peripheral of the rear opening 80. It should be noted that the rear panel 74 and the case body 72 need not necessarily be separate component parts. The rear panel 74 may be integral with the case body 72.

The end plate 70 is joined to the case body 72 using bolts 82 in a manner to close the right opening 78. In the structure, the end plate 70 is provided so as to face one end (right end, an end indicated by the arrow BR) of the stack body 20 (see FIG. 1) in the stacking direction, provided in the case body 72. The seal member 84 is interposed between the case body 72 and the end plate 70, along the outer periphery of the right opening 78. The end plate 70 has a rectangular plate having the longitudinal direction oriented in the front/rear direction (indicated by the arrow A).

Figure 4:
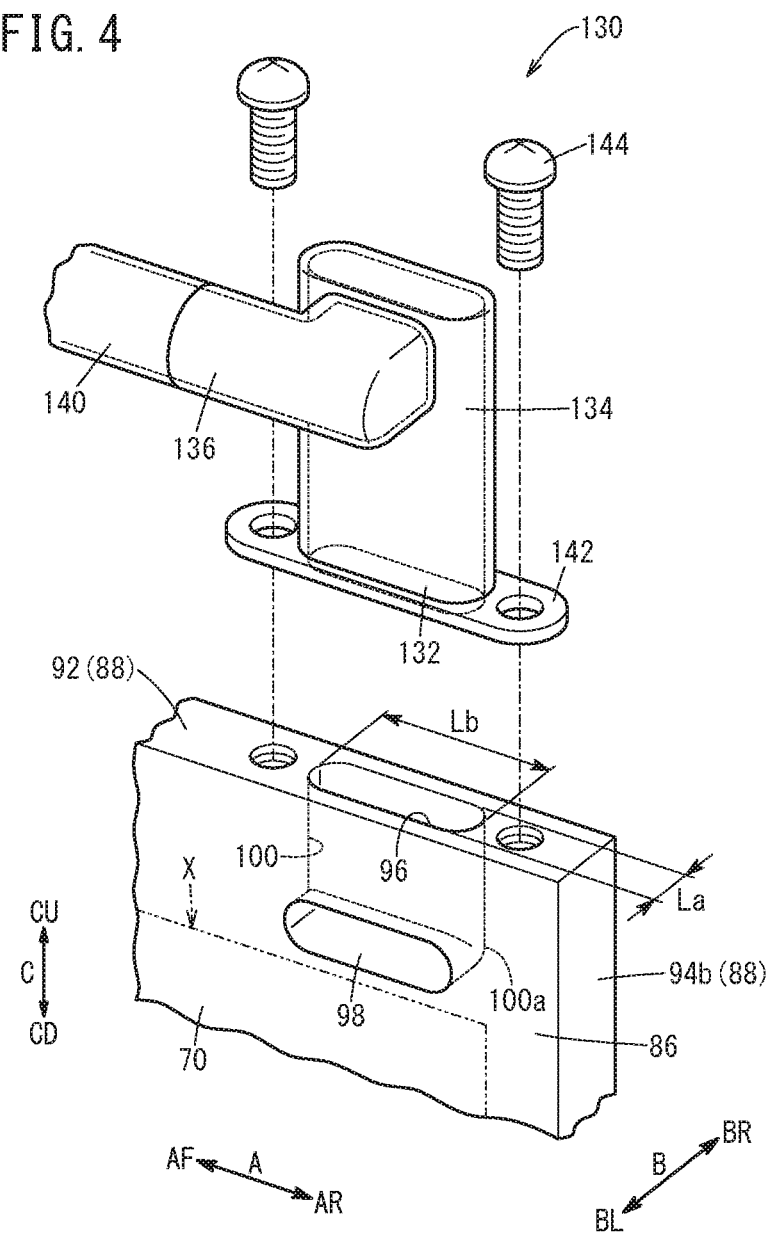
FIG. 4 is an exploded perspective view showing main components of an end plate and a plate connection member.

As shown in FIG. 4, the end plate 70 has an inner main surface 86 provided at one end (left end, an end indicated by an arrow BL) of the end plate 70 in the thickness direction (indicated by an arrow B), facing the inside of the stack case 60 (case body 72, see FIG. 3). The second insulating plate 28 provided at the right end of the stack body 20 (see FIG. 1) is positioned so as to face the inside of an area X indicated by a two-dot chain line in FIG. 4, of the inner main surface 86, through the right opening 78 of the case body 72 (see FIG. 3). That is, the outer marginal portion of the area X corresponds to the outer peripheral end of the second insulating plate 28.

Further, as shown in FIG. 3, an outer peripheral end surface 88 of the end plate 70 includes a bottom surface 90, an upper surface 92, and side surfaces 94a, 94b. As shown in FIGS. 3 and 4, at one end of the end plate 70 in the longitudinal direction (rear end indicated by an arrow AR), a first opening 96 opened in the upper surface 92, a second opening 98 opened in the upper part of the inner main surface 86, and a connection channel 100 extending inside the end plate 70 to connect the first opening 96 and the second opening 98, are provided. As shown in FIG. 4, the second opening 98 is provided in the longitudinal direction (indicated by the arrow A) of the end plate 70, outside the area X of the inner main surface 86. Further, the connection channel 100 includes a bent portion 100a, and has an L-shape as viewed in the direction indicated by the arrow A.

In the first opening 96, the length Lb of the first opening 96 in the peripheral direction of the end plate 70 is larger than the length La of the first opening 96 in the thickness direction (indicated by an arrow B) of the end plate 70. Further, both ends of the first opening 96 in the peripheral direction of the end plate 70 have a circular arc shape.

As shown in FIG. 1, the auxiliary device case 64 is a protection case for protecting the fuel cell auxiliary devices 62. As the fuel cell auxiliary devices 62, a hydrogen system auxiliary device (fuel gas supply device) 102 is stored in the auxiliary device case 64. The hydrogen system auxiliary device 102 includes injectors 102a, 102b, a fuel gas pump 102c, and valves (not shown).

Specifically, as shown in FIG. 3, the auxiliary device case 64 includes a first case member 104 and a second case member 106 each having a box shape. One end of each of the first case member 104 and the second case member 106 is opened, and flanges 104a, 106a are provided around openings of the first case member 104 and the second case member 106. The first case member 104 and the second case member 106 are joined together by fixing the flanges 104a, 106a together using bolts. An auxiliary device storage space 110 storing the hydrogen system auxiliary device 102 (see FIG. 1) is formed between the first case member 104 and the second case member 106 that are joined together as described above.

A partition wall 112 for closing the left opening 76 is provided at the right end (end indicated by the arrow BR) of the first case member 104, and the partition wall 112 is joined to a left end (end indicated by an arrow BL) of the case body 72 using bolts 82. The seal member 84 made of elastic material is interposed between the partition wall 112 and the case body 72, along the outer periphery of the left opening 76. The partition wall 112 of the auxiliary device case 64 also has a function of the end plate of the stack case 60. As a result, in the case unit 66, a stack body storage space 114 storing the stack body 20 (see FIG. 1) is formed on the right side of the partition wall 112, and the auxiliary device storage space 110 is formed on the left side of the partition wall 112. That is, the stack case 60 is formed by the partition wall 112 facing the left end of the stack body 20, the peripheral wall case 68 facing the outer peripheral surface of the stack body 20, and the end plate 70 facing the right end of the stack body 20. The stack body storage space 114 is formed inside the stack case 60.

A plurality of passages 116 connecting the stack body storage space 114 and the auxiliary device storage space 110 are provided in an upper part of the partition wall 112, and the seal member 84 is provided outside the passages 116. Further, the partition wall 112 has two piping openings 118 for inserting connection pipes (not shown) into the piping openings 118, and these connection pipes are connected to the oxygen-containing gas supply passage 44a, the oxygen-containing gas discharge passage 44b, the fuel gas supply passage 48a, the fuel gas discharge passage 48b, the coolant supply passage 46a and the coolant discharge passage 46b (see FIG. 2) provided in the stack body 20, respectively.

In the case unit 66, a peripheral wall through hole 122 penetrates through an upper wall 120 of the peripheral wall case 68, in a part closer to the other end in the longitudinal direction of the end plate 70, opposite to the first opening 96. Stated otherwise, the peripheral wall through hole 122 is formed at the right end (indicated by the arrow BR) of the front end (indicated by the arrow AF) of the upper wall 120, to connect the inside and the outside of the stack body storage space 114. Auxiliary device case through holes 126 penetrate through an upper wall 124 of the second case member 106 of the auxiliary device case 64, at both ends in the front/rear direction (indicated by the arrow A), respectively. The auxiliary device case through holes 126 connect the inside and the outside of the auxiliary device storage space 110.

Further, it is possible to supply air to the inside (the stack body storage space 114 and the auxiliary device storage space 110) of the case unit 66, through ventilation holes 128 penetrating through the lower part of the end plate 70, the lower part of the rear panel 74, and the lower part of the side wall of the auxiliary device case 64. In FIG. 1, the ventilation holes 128 are omitted.

In FIG. 4, a plate connection member 130 is connected to the first opening 96 provided in the upper surface 92 of the end plate 70. For example, the plate connection member 130 is a hollow member, e.g., made of metal. The plate connection member 130 includes an opening side end 132 (lower end) as an end portion on the side connected to the first opening 96, a first extension part 134 extending upward from the opening side end 132, and a second extension part 136 connected to the left end (end indicated by the arrow BL) on the upper side (indicated by an arrow CU) of the first extension part 134 and extending toward the front side (indicated by an arrow AF). That is, the second extension part 136 is provided inward of the first extension part 134 (indicated by the arrow BL) in the stacking direction. The front end of the second extension part 136 is coupled to the rear end of a first connection pipe 140 (connection pipe).

Figure 5:
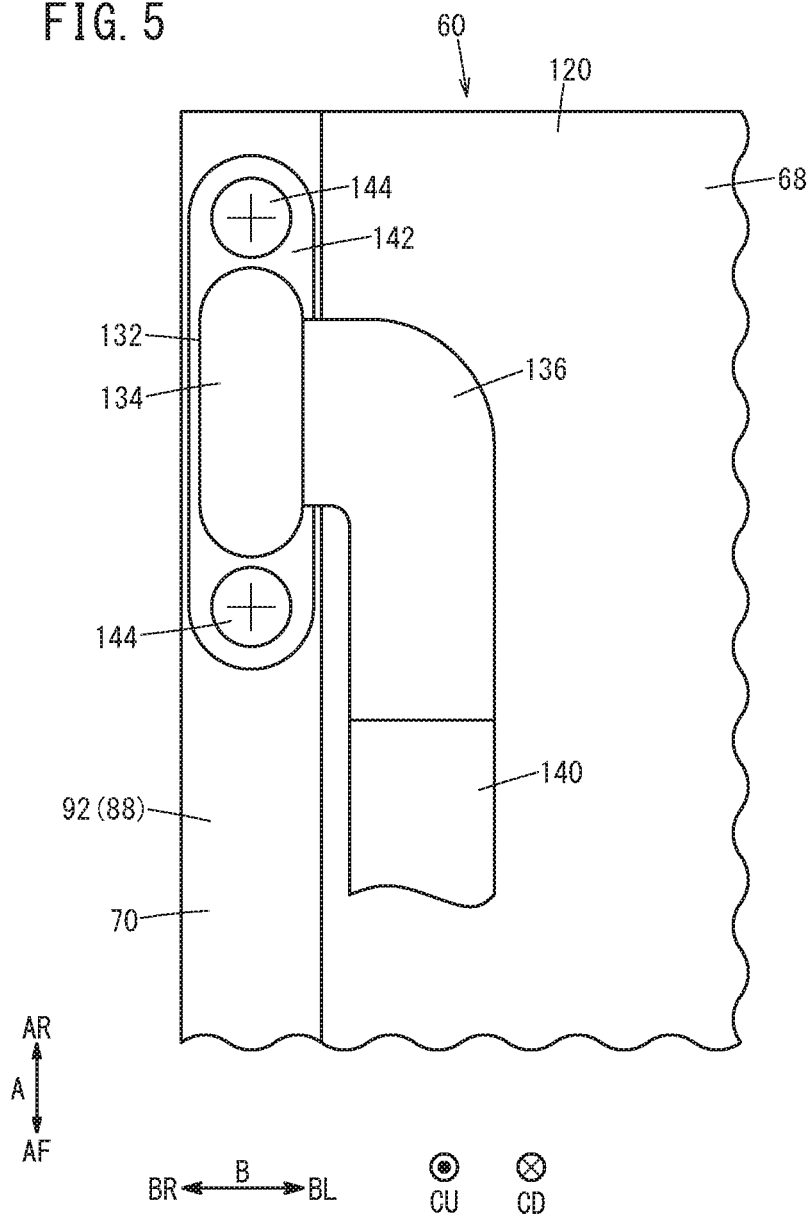
FIG. 5 is a plan view showing main components of the plate connection member connected to a first opening of the end plate.

Further, as shown in FIGS. 4 and 5, a flange 142 is provided at the opening side end 132 which covers the first opening 96, and the flange 142 and the end plate 70 are fixed together using tightening members 144 such as bolts, at positions adjacent to both ends of the first opening 96 in the longitudinal direction. It should be noted that a plate shaped elastic seal (not shown) is interposed between the flange 142 and the outer peripheral end surface 88 (upper surface 92).

In the structure, the plate connection member 130 is connected to the first opening 96. In this regard, both ends in the stacking direction (indicated by the arrow B) of, at least the opening side end 132, the flange 142, and the first extension part 134 of the plate connection member 130 are provided within the range of the thickness of the end plate 70. That is, in the embodiment of the present invention, each of the opening side end 132, the flange 142, and the first extension part 134 of the plate connection member 130 has a flat shape where the length in the front/rear direction (peripheral direction of the outer peripheral end surface 88 indicated by the arrow A) is larger than the length in the left/right direction (stacking direction indicated by the arrow B).

As shown in FIG. 1, a lower end of an annular peripheral wall connection member 146 is connected to the peripheral wall through hole 122 provided in the upper wall 120 of the peripheral wall case 68. The front end of the first connection pipe 140 is connected to the upper end of the peripheral wall connection member 146. The lower ends of annular auxiliary device case connection members 148a, 148b are connected to the auxiliary device case through holes 126 provided in the upper wall 124 of the second case member 106, respectively. The front end of a second connection pipe 150 is connected to the upper end of the auxiliary device case connection member 148a provided at the front end of the second case member 106. The rear end of the second connection pipe 150 is connected to the upper end of the auxiliary device case connection member 148b provided at the rear end of the second case member 106.

The first connection pipe 140 and the second connection pipe 150 are connected together through a merge pipe 152, and the merge pipe 152 is connected to an exhaust gas duct 138. That is, the inside of the stack case 60 and the inside of the auxiliary device case 64 is connected to the exhaust gas duct 138 extending in the vehicle width direction (indicated by the arrow B) through the first connection pipe 140, the second connection pipe 150, and the merge pipe 152.

The first connection pipe 140 extends through the left side (inside in the stacking direction) of the right end (end indicated by the arrow BR) of the stack case 60, between the peripheral wall connection member 146 and the plate connection member 130. The second connection pipe 150 extends through the right side (inside in the stacking direction) of the left end (end in the direction indicated by the arrow BL) of the auxiliary device case 64, and extends between the auxiliary device case connection members 148a, 148b. The front ends of the first connection pipe 140 and the second connection pipe 150 are connected to the merge pipe 152.

One end (right end) of the merge pipe 152 in the extending direction is coupled to the exhaust gas duct 138 through the first connection pipe 140, and the other end of the merge pipe 152 in the extending direction is coupled to the exhaust gas duct 138 through the second connection pipe 150. The exhaust gas duct 138 extending on the right side of the merge pipe 152 is connected to a right exhaust gas port 156 provided in a right fender 154 of the fuel cell vehicle 12. The exhaust gas duct 138 extending on the left side of the merge pipe 152 is connected to a left exhaust gas port 160 provided in a left fender 158 of the fuel cell vehicle 12. That is, the exhaust gas duct 138 is connected to the outside of the fuel cell vehicle 12 through the right exhaust gas port 156 and the left exhaust gas port 160.

Operation of the fuel cell vehicle 12 including the fuel cell system 10 having the structure as described above will be described.

During operation of the fuel cell vehicle 12 (FIG. 1), the fuel gas is supplied to the fuel gas supply passage 48a (FIG. 2) of the fuel cell system 10, the oxygen-containing gas is supplied to the oxygen-containing gas supply passage 44a (FIG. 2), and the coolant is supplied to the coolant supply passage 46a (FIG. 2). As shown in FIG. 2, the fuel gas supplied to the fuel gas supply passage 48a flows into the fuel gas flow field 52 of the second separator 34, and the fuel gas flows along the anode 40. The oxygen-containing gas supplied to the oxygen-containing gas supply passage 44a flows into the oxygen-containing gas flow field 50 of the first separator 32, and the oxygen-containing gas flows along the cathode 38.

Thus, in the membrane electrode assembly 30, the fuel gas supplied to the anode 40 and the oxygen-containing gas supplied to the cathode 38 are partially consumed in electrochemical reactions in the electrode catalyst layers to perform power generation. The remaining fuel gas which has not been consumed in the electrochemical reactions is discharged from the fuel gas discharge passage 48b, and the remaining oxygen-containing gas is discharged from the oxygen-containing gas discharge passage 44b.

In the meanwhile, the coolant supplied to the coolant supply passage 46a flows through the coolant flow field 54 to cool the membrane electrode assembly 30. Thereafter, the coolant is discharged from the coolant discharge passage 46b.

As shown in FIG. 1, in the case where the fuel gas is leaked out of the stack body 20 into the stack case 60 (stack body storage space 114), as shown in FIG. 4, the leaked fuel gas can flow into the first connection pipe 140 through the second opening 98, the connection channel 100, the first opening 96, and the plate connection member 130. Further, as shown in FIG. 1, the leaked fuel gas in the stack case 60 can also flow into the first connection pipe 140 through the peripheral wall through hole 122 and the peripheral wall connection member 146.

Further, the leaked fuel gas which flowed from the stack body storage space 114 into the auxiliary device storage space 110 or the fuel gas leaked from the hydrogen system auxiliary device 102 to the auxiliary device storage space 110 can flow into the second connection pipe 150 through the auxiliary device case through holes 126 and the auxiliary device case connection members 148a, 148b. The leaked fuel gas which flowed into the first connection pipe 140 and the second connection pipe 150 is guided into at least one of the right exhaust gas port 156 and the left exhaust gas port 160 through the merge pipe 152 and the exhaust gas duct 138, and discharged to the outside of the vehicle.

As described above, in the fuel cell system 10 according to the embodiment of the present invention, the plate connection member 130 for connecting the inside (stack body storage space 114) of the stack case 60 to the exhaust gas duct 138 is connectable to the first opening 96 provided in the upper surface 92 of the end plate 70. Therefore, unlike the case where the first opening 96 is provided in the back surface of the inner main surface 86 of the end plate 70, even if the plate connection member 130 is connected to the end plate 70, the plate connection member 130 does not protrude significantly outside the stack case 60 in the stacking direction (indicated by the arrow B).

Further, it is adequate that at least the opening side end 132 of the plate connection member 130 connected to the first opening 96 has a size enough to cover the first opening 96. That is, it is easy to reduce the width of the opening side end 132 in the stacking direction (indicated by the arrow B) to be substantially equal to the thickness of the end plate 70. Also in this case, it is possible to easily prevent the plate connection member 130 from protruding outside the stack case 60 in the stacking direction.

As a result, even in the case of adopting structure where the plate connection member 130 for connecting the inside of the stack case 60 to the exhaust gas duct 138 which guides the leaked fuel gas to the predetermined position, such as the outside of the fuel cell vehicle 12, is connectable to the end plate 70, it is possible to suppress increase in the size of the fuel cell system 10, in particular, in the stacking direction.

In the fuel cell system 10 according to the embodiment of the present invention, one end portion (the opening side end 132) of the plate connection member 130 is connected to the first opening 96, and both ends of the one end portion in the stacking direction (left/right direction indicated by the arrow B) are provided within the range of the thickness of the end plate 70. As described above, by making the width of the opening side end 132 in the stacking direction to be within the range of the thickness of the end plate 70, to reduce the thickness of the plate connection member 130, it becomes possible to suppress increase in the size of the fuel cell system 10 in the stacking direction more effectively. It should be noted that the width of the opening side end 132 in the stacking direction may exceed the thickness of the end plate 70 as long as the opening side end 132 does not protrude significantly outside of the fuel cell system 10 in the stacking direction. The width of the first extension part 134 and the width of the flange 142 may exceed the thickness of the end plate 70 as long as the first extension part 134 and the flange 142 do not protrude significantly outside of the fuel cell system 10 in the stacking direction.

In the fuel cell system 10 according to the embodiment of the present invention, the first opening 96 is provided in the upper surface 92 of the end plate 70. Since hydrogen as the fuel gas has low mass, the hydrogen tends to move upward (in the direction indicated by the arrow CU) in the vertical direction. Therefore, by providing the first opening 96 in the upper surface 92 of the end plate 70, it becomes possible to guide the hydrogen leaked into the stack case 60 to the exhaust gas duct 138 (first connection pipe 140) efficiently.

Figure 6:
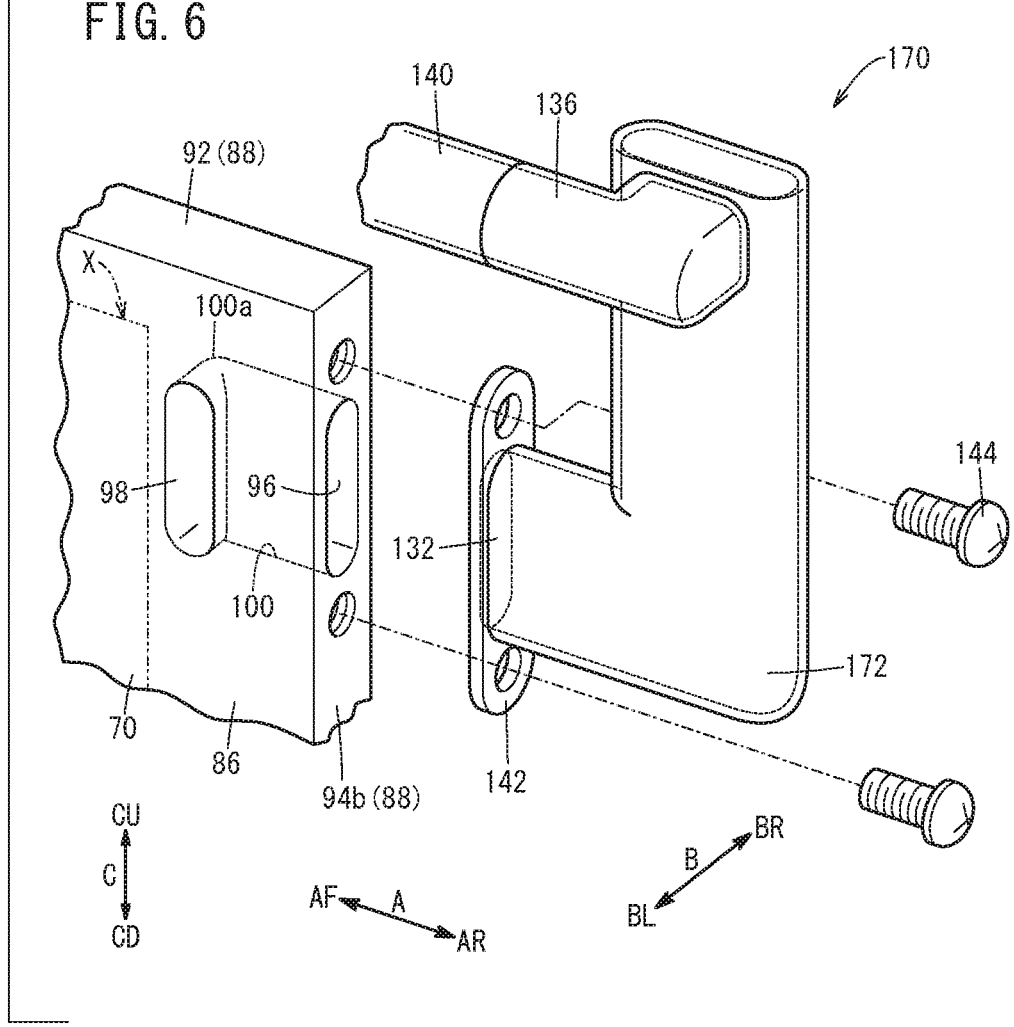
FIG. 6 is an exploded perspective view showing main components of an end plate and a plate connection member according to a modified embodiment.

It should be noted that the first opening 96 may be provided in one of, or both of upper parts of the side surfaces 94a, 94b, instead of the upper surface 92 of the end plate 70. As shown in FIG. 6, in the case where the first opening 96 is provided in the side surface 94b at the rear end (indicated by the arrow AR) of the end plate 70, for example, the second opening 98 is provided along the upper/lower direction (indicated by the arrow C) outside the area X of the inner main surface 86. Further, the connection channel 100 includes a bent portion 100a to have an L-shape as viewed in the direction indicated by the arrow C. Further, instead of the plate connection member 130, a plate connection member 170 may be connected to the first opening 96.

For example, the plate connection member 170 is made of metal, and has a hollow shape. The plate connection member 170 includes an opening side end 132 which covers the first opening 96, a bent part 172 extending rearward from the opening side end 132 (in the direction indicated by the arrow AR) by a predetermined distance, and then, extending upward (in the direction indicated by the arrow CU), and a second extension part 136 extending forward (in the direction indicated by the arrow AF) from the left end (end in the direction indicated by the arrow BL) of the upper side (in the direction indicated by the arrow CU) of the bent part 172. That is, the second extension part 136 is provided inward of the bent part 172 in the stacking direction (in the direction indicated by the arrow BL). The front end of the second extension part 136 is connected to the rear end of the first connection pipe 140.

Each of the opening side end 132, the flange 142, and the bent part 172 of the plate connection member 170 has a flat shape where the length in the upper/lower direction (peripheral direction of the outer peripheral end surface 88 indicated by the arrow C) is larger than the length in the left/right direction (stacking direction indicated by the arrow B). In this regard, both ends in the stacking direction (indicated by the arrow B) of, at least the opening side end 132, the flange 142, and the bent part 172 of the plate connection member 170 are provided within the range of the thickness of the end plate 70.

Also in the case shown in FIG. 6, the leaked hydrogen in the stack case 60 is guided into the exhaust gas duct 138 through the second opening 98, the connection channel 100, the first opening 96, the plate connection member 170, etc., and it is possible to discharge the leaked hydrogen to the outside of the fuel cell vehicle 12 (FIG. 1). In this regard, in comparison with the case where the first opening 96 is provided in the back surface of the inner main surface 86 of the end plate 70, the plate connection member 130 does not protrude significantly outside the stack case 60 in the stacking direction.

Further, since it is easy to reduce the width of the opening side end 132 of the plate connection member 170 to be substantially equal to the thickness of the end plate 70, it is possible to prevent the plate connection member 170 from being protruding outside the stack case 60 in the stacking direction easily. Accordingly, even in the case where the plate connection member 170 is connectable to the end plate 70, it is possible to suppress increase in the size of the fuel cell system 10 in the stacking direction.

It should be noted that the first opening 96 may be provided in all of the upper surface 92 and the side surfaces 94a, 94b of the end plate 70, and may be provided selectively in any one of, or a plurality of the upper surface 92 and the side surfaces 94a, 94b of the end plate 70. In view of making it easier to discharge the fuel gas having low mass, it is preferable to provide the first opening 96 in the upper part of the outer peripheral end surface 88 in the vertical direction.

In the fuel cell system 10 according to the embodiment of the present invention, as shown in FIG. 4, the length Lb of the first opening 96 in the peripheral direction of the end plate 70 is larger than the length La of the first opening 96 in the thickness direction of the end plate 70. The flange 142 is provided for the plate connection member 130, and the flange 142 and the end plate 70 are fixed together at positions adjacent to both ends of the first opening 96 in the longitudinal direction through the tightening member 144.

By adopting the above shape of the first opening 96 to use the upper surface 92 of the end plate 70 effectively, it becomes possible to provide the first opening 96 having a size sufficient to allow the leaked hydrogen to pass through the first opening 96. Further, the flange 142 and the end plate 70 are fixed at positions adjacent to both ends of the first opening 96 in the longitudinal direction using the tightening members 144. In this manner, it becomes possible to suitably connect the plate connection member 130 to the first opening 96 without increasing the width of the plate connection member 130. Moreover, it becomes possible to effectively suppress increase in the size of the fuel cell system 10 in the stacking direction. The plate connection member 170 also offers the same advantage.

In the fuel cell system 10 according to the above embodiment, the end plate 70 has a rectangular shape, and the first opening 96 is provided at one end of the end plate 70 in the longitudinal direction. However, the first opening 96 may be provided at any position, and any number of first openings 96 may be provided as long as the first opening 96 is or the first openings 96 are provided in the upper part of the outer peripheral end surface 88 of the end plate 70.

In the fuel cell system 10 according to the above embodiment, the peripheral wall case 68 has the peripheral wall through hole 122 configured to connect the inside and the outside of the peripheral wall case 68, in the part closer to the other end of the peripheral wall case 68 in the longitudinal direction of the end plate 70, opposite to the first opening 96. The exhaust gas duct 138 is connected to the inside of the stack case 60 through the first connection pipe 140 (connection pipe), one end of the first connection pipe 140 is coupled to the peripheral wall connection member 146 connected to the peripheral wall through hole 122, the other end of the first connection pipe 140 is coupled to the plate connection member 130, and the first connection pipe 140 extends through the inside of the end of the stack case 60 in the stacking direction, between the peripheral wall connection member 146 and the plate connection member 130.

In this case, it become possible to guide the leaked hydrogen in the stack case 60 to the exhaust gas duct 138 also from the peripheral wall through hole 122, in addition to the first opening 96. In the structure, even if the fuel cell vehicle 12 is tilted, it is possible to suitably discharge the leaked hydrogen in the stack case 60. Further, after the leaked hydrogen guided from the plurality of positions of the stack case 60 are merged in the first connection pipe 140 and the merge pipe 152, the leaked hydrogen can be discharged to the outside of the fuel cell vehicle 12 through the exhaust gas duct 138. That is, it is not necessary to separately connect the exhaust gas duct 138 extending toward the outside of the fuel cell vehicle 12, to each of the first opening 96 and the peripheral wall through hole 122. Also in this manner, it is possible to suppress increase in the size of the fuel cell system 10. Further, since the first connection pipe 140 is provided inside of the end of the stack case 60 in the stacking direction, it is possible to effectively suppress increase in the size of the fuel cell system 10 in the stacking direction.

In the above embodiment, the peripheral wall through hole 122 is provided in the upper wall 120 of the peripheral wall case 68. Alternatively, the peripheral wall through hole 122 may be provided in a side wall 180 (FIG. 1) or the rear panel 74 (FIG. 3) of the peripheral wall case 68. Further, the peripheral wall through hole 122 need not necessarily be provided in the peripheral wall case 68. In this case, for example, if the peripheral wall through hole 122 is not provided, the number of first openings 96 may be increased.

In the fuel cell system 10 according to the above embodiment, as shown in FIGS. 4 and 6, the second opening 98 extends substantially straight in the longitudinal direction (front/rear direction indicated by the arrow A) or the upper/lower direction (indicated by the arrow C) of the end plate 70, outside the area X of the inner main surface 86. In this manner, by providing the second opening 98 outside the area X, it is possible to guide the leaked hydrogen in the stack case 60 to the exhaust gas duct 138 efficiently, without closing the second opening 98 by the second insulating plate 28, etc. Further, by adopting the second opening 98 having a substantially straight shape, it is possible to simplify the structure of the second opening 98 and/or the connection channel 100.

Figure 7:
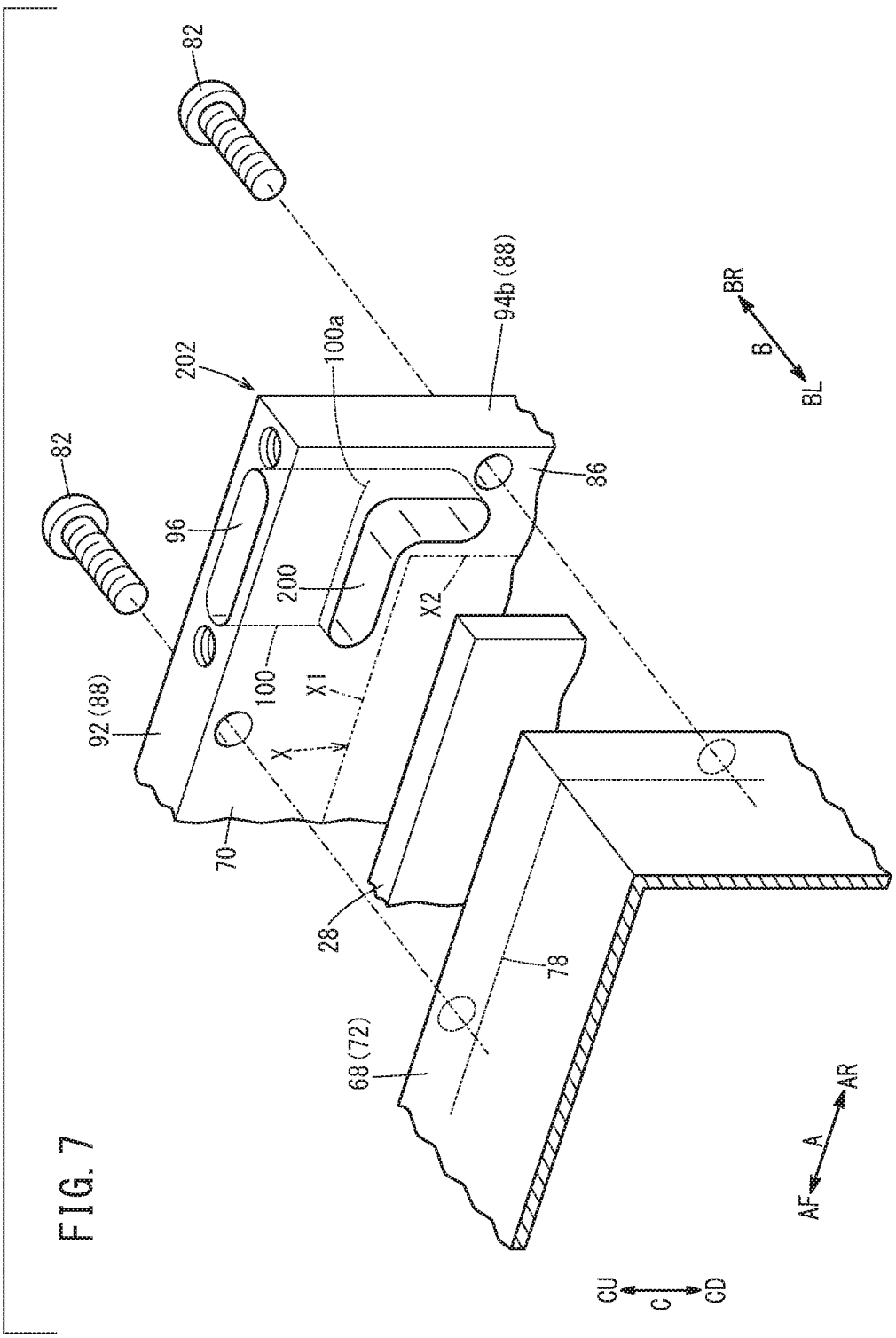
FIG. 7 is an exploded perspective view showing main components of an end plate having a second opening, a second insulating plate, and a peripheral wall case according to a modified embodiment.

However, the shape of the second opening 98 is not limited specially. For example, as shown in FIG. 7, instead of the straight second opening 98, a curved second opening 200 may be provided in the end plate 70.

The second opening 200 is curved along corners 202 at the upper end (indicated by the arrow CU) and at the rear end (indicated by the arrow AR) of the end plate 70, outside the area X. That is, the second opening 200 extends between the upper surface 92 and the upper side X1 of the area X, and between a rear side surface 94*b* and the side X2 extending in the upper/lower direction (indicated by the arrow C) at the rear end (indicated by the arrow AR) of the area X, with a curve. As described above, by adopting the second opening 200 having a curved shape, it become possible to effectively utilize the corner 202 of the end plate 70, and increase the area of the second opening 200. Moreover, it become possible to efficiently guide the leaked hydrogen in the stack case 60 to the exhaust gas duct 138.

In the above embodiment, the entire second openings 98, 200 are provided outside the area X. However, as long as discharging of the leaked hydrogen in the stack case 60 through the second openings 98, 200 is not disturbed substantially, the second openings 98, 200 may be provided partially inside the area X.

In the fuel cell system 10 according to the above embodiment, the ventilation hole 128 configured to allow air to flow into the inside of the stack case 60 is provided at the lower position of the stack case 60. In this case, ventilation in the stack case 60 is facilitated, and it becomes possible to effectively guide the leaked hydrogen in the stack case 60 to the exhaust gas duct 138.

In the fuel cell system 10 according to the above embodiment, the end plate 70 is provided at one end in the stacking direction, the auxiliary device case 64 configured to store the fuel cell auxiliary device 62 is provided at the other end in the stacking direction, the inside of the auxiliary device case 64 is connected to the inside of the stack case 60, the auxiliary device case through hole 126 configured to connect the inside and the outside of the auxiliary device case 64 is provided in at least one of the upper wall and the side wall of the auxiliary device case 64, and the exhaust gas duct 138 and the inside of the auxiliary device case 64 are connected together through the auxiliary device case connection member 148*a*, 148*b* connected to the auxiliary device case through hole 126.

In this case, even in the fuel cell system 10 having the auxiliary device case 64, it becomes possible to suppress increase in the size of the fuel cell system 10 in the stacking direction, and suitably guide the leaked hydrogen in the auxiliary device case 64 and the stack case 60 to the exhaust gas duct 138.

In the above embodiment, the side wall at the left end of the stack case 60 is formed by the partition wall 112 of the auxiliary device case 64. In this manner, by using a common constituent element for part of the auxiliary device case 64 and part of the stack case 60, it is possible to reduce the size of the case unit 66. However, the fuel cell system 10 need not necessarily include the auxiliary device case 64. For example, the end plates 70 may be provided at both ends of the stack body 20 in the stacking direction (left/right direction). In the structure, the side wall at the left end of the stack case 60 is formed by the end plate 70 as well. In this case, the first opening 96 may be provided in the upper surface 92 and/or the side surfaces 94*a*, 94*b* of each of the end plates 70 provided at both of left and right ends of the stack case 60.

The present invention is not limited to the above described embodiment. It is a matter of course that various modifications may be made without departing from the gist of the present invention.

For example, in the above embodiment, the fuel cell system 10 is mounted in the fuel cell vehicle 12 in a manner that the stacking direction of the stack body 20 is oriented in the left/right direction of the fuel cell vehicle 12. However, the present invention is not limited specially in this respect. The stacking direction of the stack body 20 may be oriented in any direction such as the front/rear direction of the fuel cell vehicle 12 and the upper/lower direction of the fuel cell vehicle 12. Further, in the above embodiment, the auxiliary device case 64 is provided at the left end of the stack case 60. Alternatively, the auxiliary device case 64 may be provided at the right end of the stack case 60.

What is claimed is:

1. A fuel cell system comprising:
a stack body including a plurality of stacked power generation cells;
a stack case configured to store the stack body; and
an end plate provided at an end of the stack body in a stacking direction,
wherein the stack case is formed to include a peripheral wall case configured to cover an outer peripheral surface of the stack body, and the end plate;
the end plate has an inner main surface provided at one end of the end plate in a thickness direction, the inner main surface facing inside of the stack case;
the end plate has a first opening opened in an upper part of an outer peripheral end surface of the end plate and a second opening opened in the inner main surface, in an upper part of the end plate;
a connection channel configured to connect the first opening and the second opening is provided inside the end plate; and
the inside of the stack case and an exhaust gas duct are connected together through a plate connection member connected to the first opening.

2. The fuel cell system according to claim 1, wherein one end portion of the plate connection member is connected to the first opening, and both ends of the one end portion in the stacking direction are provided within a range of a thickness of the end plate.

3. The fuel cell system according to claim 1, wherein the first opening is provided in an upper surface of the end plate.

4. The fuel cell system according to claim 1, wherein a length of the first opening in a peripheral direction of the end plate is larger than a length of the first opening in a thickness direction of the end plate;
the plate connection member is provided with a flange; and
the flange and the end plate are fixed together at positions adjacent to both ends of the first opening in a longitudinal direction through a tightening member.

5. The fuel cell system according to claim 1, wherein the end plate has a rectangular shape; and
the first opening is provided at one end of the end plate in a longitudinal direction.

6. The fuel cell system according to claim 5, wherein the peripheral wall case has a peripheral wall through hole configured to connect inside and outside of the peripheral wall case, in a part closer to another end in the longitudinal direction of the end plate, opposite to the first opening;
the exhaust gas duct is connected to the inside of the stack case through a connection pipe;
one end of the connection pipe is coupled to a peripheral wall connection member connected to the peripheral wall through hole, and another end of the connection pipe is coupled to the plate connection member; and
the connection pipe extends through inside of the end of the stack case in the stacking direction, between the peripheral wall connection member and the plate connection member.

7. The fuel cell system according to claim 1, wherein an insulating plate is provided at an end of the stack body in the stacking direction, facing the inner main surface; and
the second opening is provided outside an area of the inner main surface facing the insulating plate.

8. The fuel cell system according to claim 7, wherein the second opening has a shape curved along a corner of the end plate, outside the area.

9. The fuel cell system according to claim 1, wherein a ventilation hole configured to allow air to flow into the inside of the stack case is provided at a lower position of the stack case.

10. The fuel cell system according to claim 1, wherein the end plate is provided at one end in the stacking direction;
an auxiliary device case configured to store a fuel cell auxiliary device is provided at another end in the stacking direction;
inside of the auxiliary device case is connected to the inside of the stack case;
an auxiliary device case through hole configured to connect the inside and outside of the auxiliary device case is provided in at least one of an upper wall and a side wall of the auxiliary device case; and
the exhaust gas duct and the inside of the auxiliary device case are connected together through an auxiliary device case connection member connected to the auxiliary device case through hole.

* * * * *